US010908935B1

(12) United States Patent
Taylor et al.

(10) Patent No.: US 10,908,935 B1
(45) Date of Patent: Feb. 2, 2021

(54) ESTIMATION OF GUEST CLOCK VALUE BASED ON BRANCH INSTRUCTION COUNT AND AVERAGE TIME BETWEEN BRANCH INSTRUCTIONS FOR USE IN DETERMINISTIC REPLAY OF EXECUTION

(71) Applicant: Raytheon Company, Waltham, MA (US)

(72) Inventors: Matthew A. Taylor, San Antonio, TX (US); John R. Wagner, Melbourne, FL (US); Chad D. McConnell, Indialantic, FL (US)

(73) Assignee: Raytheon Company, Waltham, MA (US)

( * ) Notice: Subject to any disclaimer, the term of this patent is extended or adjusted under 35 U.S.C. 154(b) by 196 days.

(21) Appl. No.: 16/053,468

(22) Filed: Aug. 2, 2018

(51) Int. Cl.
*G06F 9/455* (2018.01)
*G06F 9/30* (2018.01)

(52) U.S. Cl.
CPC ............ *G06F 9/455* (2013.01); *G06F 9/3005* (2013.01)

(58) Field of Classification Search
CPC ............................... G06F 9/455; G06F 9/3005
See application file for complete search history.

(56) References Cited

U.S. PATENT DOCUMENTS

| 7,475,002 | B1* | 1/2009 | Mann | G06F 9/45558 703/21 |
| 8,832,682 | B2* | 9/2014 | Xu | G06F 9/45558 718/1 |
| 9,459,652 | B1* | 10/2016 | Landers | G06F 1/12 |
| 2008/0155299 | A1* | 6/2008 | Vertes | G06F 11/1683 713/600 |
| 2011/0047315 | A1* | 2/2011 | De Dinechin | G06F 1/14 711/6 |
| 2011/0252266 | A1* | 10/2011 | Costa | G06F 1/14 713/500 |
| 2014/0108828 | A1* | 4/2014 | Breternitz | G06F 1/329 713/300 |
| 2019/0005229 | A1* | 1/2019 | Hlaing | H04L 63/0876 |

OTHER PUBLICATIONS

"Protean Security—Services", [Online]. Retrieved from the Internet: <URL: http://www.proteansec.com/malware-analysis/next-generation-dynamic-analysis-with-panda/>, (Accessed Jun. 23, 2020), 3 pgs.

* cited by examiner

*Primary Examiner* — Meng Ai T An
*Assistant Examiner* — Michael W Ayers
(74) *Attorney, Agent, or Firm* — Schwegman Lundberg & Woessner, P.A.

(57) ABSTRACT

A method for deterministic clock replay can include in response to executing a guest clock access instruction, estimating, using a virtual processor of a guest virtual machine, a value of a guest clock of the guest virtual machine based on (a) a current branch counter value that indicates a number of branch instructions executed since a first time and (b) an average time between execution of branch instructions, comparing the estimated value to an actual guest clock value of a guest clock of the guest virtual machine, and in response to determining the estimated value is less than the actual guest clock value by a threshold value, recording the number of branch instructions, the first time, and the average time between execution of branch instructions in a memory.

20 Claims, 5 Drawing Sheets

ESTIMATION OF GUEST CLOCK VALUE BASED ON BRANCH INSTRUCTION COUNT AND AVERAGE TIME BETWEEN BRANCH INSTRUCTIONS FOR USE IN DETERMINISTIC REPLAY OF EXECUTION

TECHNICAL FIELD

Embodiments discussed herein regard devices, systems, and methods for a data efficient deterministic replay clock (DRC).

BACKGROUND

A Platform for Architecture-Neutral Dynamic Analysis (PANDA) provides a framework for virtual machine emulation or replay. PANDA was developed by Protean Security on a Quick Emulator (Qemu) platform. According to Protean Security's website last accessed Apr. 24, 2018 PANDA "makes it feasible to access all code executing in the guest and all data being manipulated in the guest virtual machine. PANDA supports the same architectures as Qemu, so every instruction set can be executed in LLVM IR." LLVM is a project that started at the University of Illinois at Urbana-Champaign to investigate compilation techniques. The LLVM is now managed by the LLVM Foundation, a non-profit company dedicated to compiler and related education.

LLVM IR is an intermediate representation (IR) of code from a compiler that is optimized to be converted into assembly language code for a target. The PANDA platform provides a deterministic replay to Qemu, by recording a clock sample for every guest virtual machine request.

Another system that provides a clock sample for every virtual machine request is the logging and replay (LoRe) replay system (2013 Institute of Electrical and Electronic Engineers (IEEE) 10$^{th}$ International Conference on High Performance Computing and Communications & 2013 IEEE International Conference on Embedded and Ubiquitous Computing). LoRe deterministic event replay is provided using kernel-based VM (KVM). LoRe exploits a VM control structure (VMCS) and a kernel notification chain.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Embodiments generally relate to determining a clock time with reduced data overhead. Embodiments can estimate a clock time using a branch counter and an estimate of a guest clock. Embodiments can save data by recording fewer clock times. Embodiments can save time by reducing a number of clock accesses or number of times the clock is stored, such as for access by a virtual machine.

Execution logging and replay is an advanced ability to reconstruct past execution of a system. Execution logging and replay has been used for system emulation, security analyses, fault tolerance, system diagnosis, and debugging. For example, the replay of a process can provide an exact execution of a previously performed process, such as to reproduce the function or action of another computer or software system. In another example, the replay of a process of privacy information theft can help an administrator to analyze and solve a security intrusion or vulnerability, or granularly monitor and analyze the exceptions and errors that occurred during the system operation at or around the time of the intrusion.

Cloud computing has become a popular computing paradigm. This is at least partially because of virtualized, scalable, and cost-efficient resource management approaches to integrate loosely-coupled resources, and improve their utility. Many companies such as Amazon.com, Inc. of Seattle, Wash., United States, Google LLC of Menlo Park, Calif., United States, and Microsoft Corporation of Redmond, Wash., United States, and Salesforce.com, Inc. of San Francisco, Calif., United States, have become cloud platform providers. The security, continuity, and implementation remain issues in cloud computing environments. Although the cloud platform can take relatively advanced measures for the security and high-availability of virtual machine and processes, it cannot completely prevent the users' sensitive information theft, system intrusion, and state monitoring for uncontrollable virtual machines.

Deterministic replay of a VM can include the recording of all non-deterministic inputs, such as clock sources, into the system. Because clock sources are frequently accessed for such recording, recording every value read incurs considerable space overhead. Embodiments provide a Deterministic Replay Clock (DRC) that addresses this problem. Embodiments can provide a clock estimator from which a virtual clock value (e.g., clock estimate) in the VM can be derived. The clock estimate approximates actual time and can be adjusted to stay accurate within a maximum error bound that can be user-specified. Instead of recording the value of the guest clock, values used to estimate the clock time are recorded until an estimated clock time either lags the guest clock by a specified amount of time, or is greater than the guest clock. Adjustments to the estimate can be made carefully to preserve monotonicity. The result can include a reduction in the amount of data recorded for many access patterns to clock sources.

Reference will now be made to the FIGS. to describe further details of embodiments.

Figure 1:
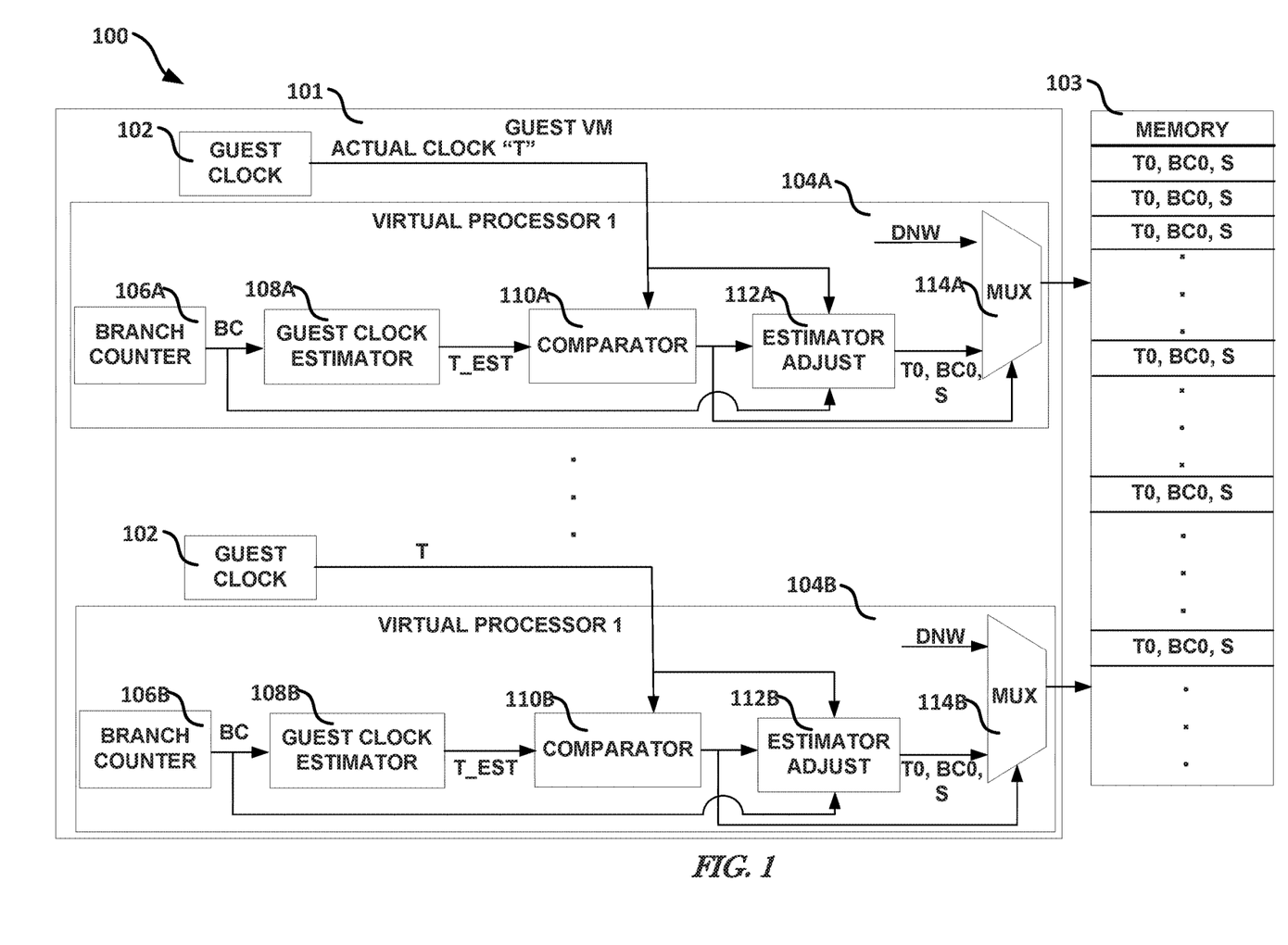
FIG. 1 illustrates, by way of example, a diagram of an embodiment of a system configured for deterministic clock determination.

FIG. 1 illustrates, by way of example, a diagram of an embodiment of a system 100 configured for deterministic clock determination. The system 100 as illustrated includes a guest VM 101 and a memory 103. The guest VM 101 as illustrated includes a guest clock 102 and a plurality of virtual processors 104A and 104B. Each of the virtual processors 104A-104B as illustrated include a branch counter 106A and 106B, respectively, a guest clock estimator 108A and 108B, respectively, a comparator 110A and 110B, respectively, an estimator adjust 112A and 112B, and a multiplexer 114A and 114B, respectively.

The guest VM 101 is the software portion of a virtual machine. The guest VM 101 usually includes an independent instance of an operating system (guest operating system) and associated software and data. The guest VM 101 and a host VM, combined, form a virtual machine. The host VM is the underlying hardware that provides compute resources, such as the memory 103, processing power, network input/output, and other support functionality. A virtual machine monitor (sometimes called a hypervisor), can intermediate between the host VM and the guest VM 101, such as to support multiple guest VMs running different operating systems.

The guest clock 102 indicates an amount of time that has elapsed in the guest VM 101 since the guest VM 101 was launched. The guest clock 102 generally counts up from a specified reset number (e.g., zero "0"). The guest clock 102 generally does not count while the guest VM 101 is suspended. Virtual clock and other timer devices of the guest VM 101 may use the guest clock 102 to calculate counter values and determine when to signal interrupts. The guest clock 102 is often synchronized with a clock of the host VM. Embodiments provide an estimate of the guest clock 102 that can be used in place of the guest clock 102, such as for determining when to signal interrupts or other operation that is dependent on the guest clock 102.

Examples of the guest clocks 102 include one of the following from an Intel processing chip from Intel Corporation of Santa Clara, Calif., United States, time stamp counter (TSC), local advanced programmable interrupt controller (APIC), advanced configuration and power interface (ACPI) power management (PM) timer, and real-time clock (RTC). Note that one of these clocks may be estimated using embodiments and the remaining of these clocks may be derived therefrom. Thus, a single estimate can be used for all time sources. The guest clock has an arbitrary, fixed frequency that does not necessarily correspond to the frequencies of any of the guest clock sources. Guest clock sources can be derived from the guest clock by way of multiplying by the guest clock source's frequency and dividing by the guest clock's frequency.

Each virtual processor 104A-104B can include a branch counter 106A-106B which counts the number of branch instructions executed by the virtual processor 104A-104B. A guest VM configured with multiple virtual processors 104A-104B may have multiple branch counters 106A-106B. The branch counter 106A-106B counts instructions that can cause the virtual processor 104A-104B to begin executing an instruction that causes it to deviate from a default behavior of executing instructions in order. Not every instruction is a branch instruction. A branch instruction causes the virtual processor 104A-104B to switch execution to a different instruction sequence (non-sequential instruction execution) as a result of the executing the branch instruction. There are multiple types of branch instructions including conditional and unconditional branch instructions. An unconditional branch instruction always causes a break in the instruction execution order. A conditional branch instruction causes a break in the instruction execution order if a defined condition is met. A non-branch instruction may also be counted as a branch if by causing an exception it causes non-sequential instruction execution to occur. A branch instruction thus causes a non-sequential change in a program counter (a memory address of a next instruction) of the virtual processor 104A-104B.

The guest clock estimator 108A-108B can estimate the value of the guest clock 102 as "T_est" based on a branch counter value ("BC") provided by the branch counter 106A-106B. The guest clock estimator 108A-108B can be a deterministic, drop-in estimate for the guest clock 102. T_est can be a linear approximation of the guest clock 102 based on a reference point in time and approximate execution speed.

In one or more embodiments, T_est can be calculated as follows. Let BC be the number of branches that the virtual processor 104A-104B has executed since the guest VM 101 was launched. Let T_0 be an arbitrary value of the guest clock 102 in the past. Let BC_0 be the value of the branch counter 106A-106B at time T_0. Let S be an approximation of an average time between executed branch instructions. T_est can be determined as T_0+S×(BC−BC_0).

Each virtual processor 104A-104B can have its own, independent guest clock estimator 108A-108B. Because the branch counter 106A-106B is an inherently deterministic quantity, the value of the guest clock estimator 108A-108B is also inherently deterministic. Deterministic means that for the same input, a same output is produced. Non-deterministic means that for the same input, a different output can be produced.

At or around the time the guest VM 101 is launched, T_0 and BC_0 can be initialized to a specified value (e.g., zero). After the value of the guest clock estimator 108A-108B is calculated, the calculated value can be compared to a current value of the guest clock 102, by the comparator 110A-110B. If the value of the guest clock estimator 108A-108B is greater than the value of the guest clock 102, or if the value of the guest clock estimator 108A-108B lags behind the value of the guest clock 102 by more than a user-specified maximum, the guest clock estimator 108A-108B can be adjusted, by the estimator adjust 112A-112B, such as to preserve both accuracy and monotonicity.

In response to the comparator 110A-110B indicating either (1) T_Est is greater than the value of the guest clock 102 or (2) T_Est is less than the value of the guest clock 102, by the specified amount or more, the estimator adjust 112A-112B can recalculate T_0, BC_0, and S. T_0, BC_0, and S can be recalculated using the following example calculation. Let T be the value of the guest clock 102. S can be initialized to some value (e.g., 0 or a random value). S can later be determined as (T−T_0)/(BC−BC_0); T_0 can be set equal to T; and BC_0 can be set equal to BC. These values can be recorded in the memory 103 in response to the recalculation. Because the value of the guest clock estimator 108A-108B is never permitted to be greater than the guest clock 102, adjustments are always forward (as compared to a last determined value for T_est by the guest clock estimator 108A-108B) and therefore preserve monotonicity.

After an adjustment occurs, the values of S and T_0 can be recorded, so that they can be updated correctly during replay. Because the branch counter 106A-106B is used to identify the point at which to inject the values of S and T_0 during replay, BC does not need to be separately recorded. With a maximum error of 100 microseconds, an experiment showed that an average of one adjustment was made per 6 guest clock accesses. That is, the value of the guest clock 102 was recorded only once in six guest clock accesses (since T0 is set to T in the recalculation). A maximum error bound can be user specified. The maximum error bound may be adjusted lower for greater accuracy at the expense of greater memory requirement. The maximum error bound may be adjusted higher for lower memory requirements at the expense of accuracy.

The multiplexer 114A-114B provides a selection of data to write to the memory 103. In the embodiment illustrated, the data to the multiplexer 114A-114B includes either do not write "DNW" or T0, BC0, and S. The comparator 110A-110B can control the output of the multiplexer 114A-114B. For example, if the comparator 110A-110B determines that (1) T_Est is greater than the value of the guest clock 102 or (2) T_Est is less than the value of the guest clock 102 by the specified amount or more, the updated values of T0, BC0, and S can be selected for writing to the memory 103. In another example, if the comparator 110A-110B determines that (1) T_Est is less than the value of the guest clock 102 and (2) T_Est is greater than the value of the guest clock 102 minus the specified amount, the DNW output can be selected.

The memory 103 can include a data memory, such as a random access memory (RAM) device. The memory 103, as previously discussed, can be a part of the host VM (not shown). A comparison between the memory 103 populated using embodiments discussed herein and embodiments of storing the value of guest clock 102 for every branch instruction is provided in FIG. 4.

Figure 2:
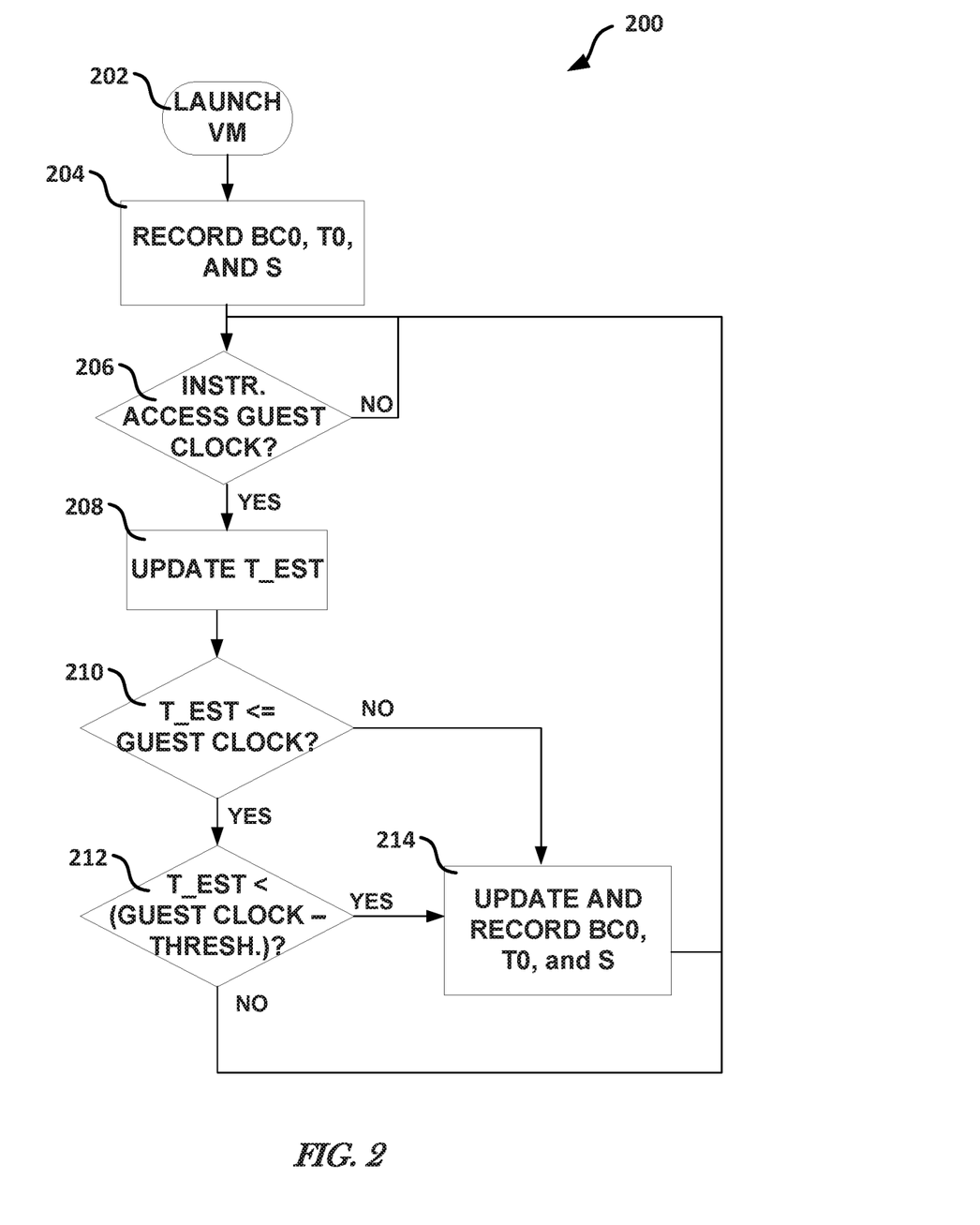
FIG. 2 illustrates, by way of example, a flow diagram of an embodiment of a method for a DRC.

FIG. 2 illustrates, by way of example, a flow diagram of an embodiment of a method 200 for a DRC. The method 200 as illustrated includes launching a VM at operation 202. Sometime after operation 202, a current branch counter value (of the branch counter 106A-106B), a guest clock value "T0" (of the guest clock 102), and an average time between execution of branch instructions "S" can be recorded (in the memory 103), at operation 204. At operation 206, it can be determined if the current instruction being executed by the virtual processor 102A-102B accesses a guest clock. An example of a guest clock access is the RDTSC (read time stamp counter) instruction on x86 processors from Intel Corporation of Santa Clara, Calif., United States. If it is determined (by the virtual processor 102A-102B), at operation 206, that the instruction accesses a guest clock, T_est can be updated at operation 208. If it is determined (by the virtual processor 102A-102B), at operation 206, that the instruction does not access a guest clock, operation 206 can be performed on a next instruction. In some embodiments, the instruction counter can be used in lieu of the branch counter. For example, due to design constraints on some machines, using the instruction counter or branch counter can cause embodiments to operate improperly. In such embodiments, the branch counter may be used in place of the instruction counter, and vice versa.

In response to, or otherwise after operation 208, it can be determined if T_est is less than (or equal to) the value of the guest clock 102, at operation 210. If T_est is less than (or equal to) to the value of the guest clock 102, it can be determined whether T_est is less than the value of the guest clock 102 minus a specified threshold (either a user specified, computer specified, or default threshold value), at operation 212. If T_est is not less than (or equal to) the value of the guest clock 102, BC0, T0, and S can be updated and recorded (in the memory 103), at operation 214. If it is determined at operation 212 that T_est is less than (or equal to) the value of the guest clock 102 minus a specified threshold, BC0, T0, and S can be updated and recorded (in the memory 103), at operation 214. If it is determined at operation 212 that T_est is not less than (or equal to) the value of the guest clock 102 minus a specified threshold, the operation 206 can be performed. The method 200 can end (not shown) after any operation, such as in response to the application or a thread of the application being executed by the virtual processor 102A-102B, the guest VM 101, or the like terminating.

Figure 3:
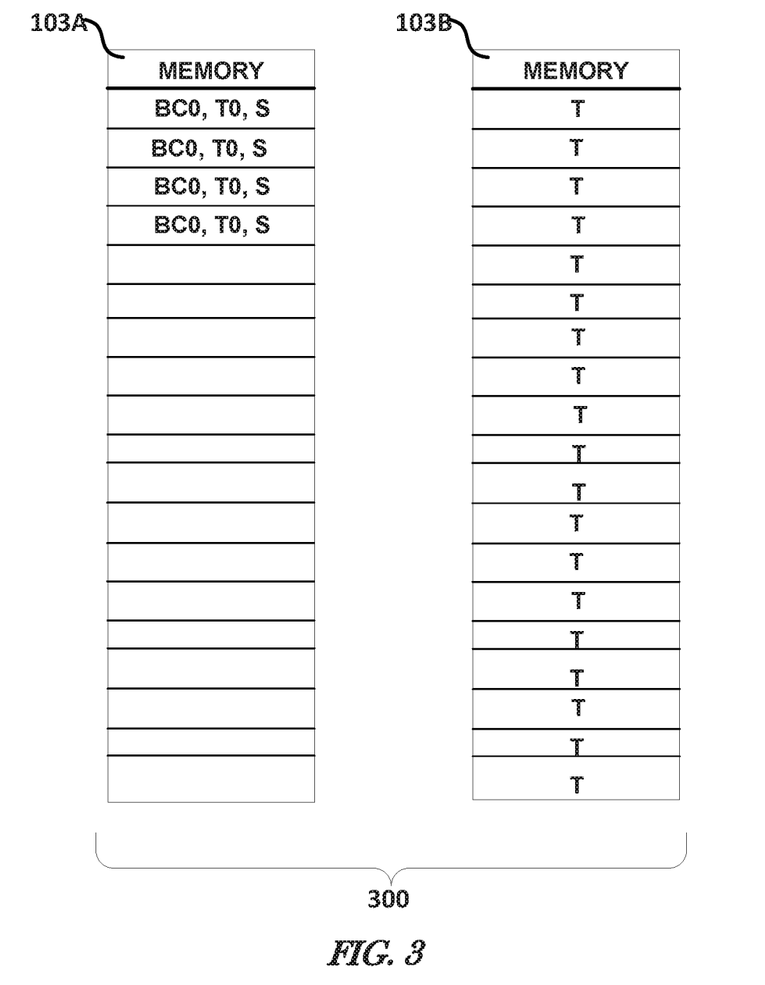
FIG. 3 illustrates, by way of example, a diagram of an embodiment of a comparison between a memory populated using embodiments discussed herein and a memory populated by recording the value of the guest clock at every branch instruction.

FIG. 3 illustrates, by way of example, a diagram of an embodiment of a comparison between a memory 103A populated using embodiments discussed herein and a memory 103B populated by recording the value of the guest clock 102 at every branch instruction. The memory 103A includes less data stored thereon. This is because, for each instruction accessing a guest clock for which T_est does not need to be updated, no clock information is recorded. In contrast, the memory 103B includes clock data for every instruction accessing a guest clock executed.

Figure 4:
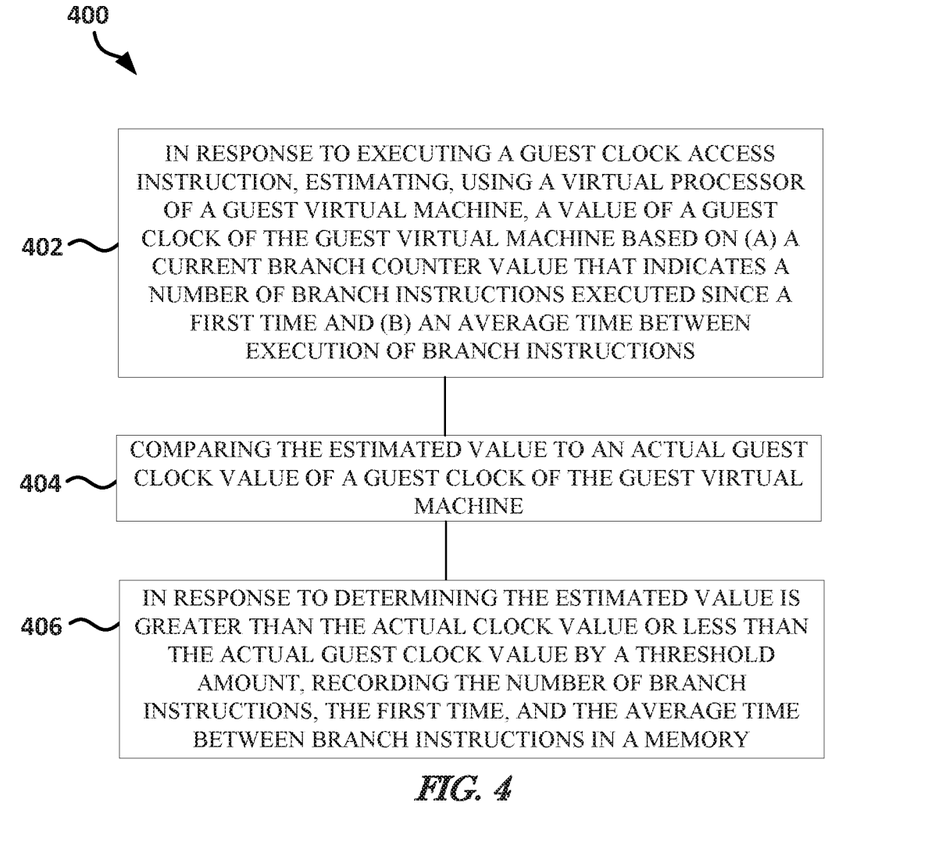
FIG. 4 illustrates, by way of example, a diagram of an embodiment of a method for guest clock estimation.

FIG. 4 illustrates, by way of example, a diagram of an embodiment of a method 400 for guest clock estimation. The method 400 as illustrated includes in response to executing a guest clock access instruction, estimating, using a virtual processor of a guest virtual machine, a value of a guest clock of the guest virtual machine based on (a) a current branch counter value that indicates a number of branch instructions executed since a first time and (b) an average time between execution of branch instructions, at operation 402; comparing the estimated value to an actual guest clock value of a guest clock of the guest virtual machine, at operation 404; and in response to determining the estimated value is less than the actual guest clock value, recording the number of branch instructions, the first time, and the average time between execution of branch instructions in a memory, at operation 406.

The method 400 can further include, in response to determining the estimated value is greater than the actual guest clock value, updating the average time between execution of branch instructions so that the estimated value is less than, or equal to, the actual guest clock value. The method can further include, wherein updating the average time between execution of branch instructions includes determining a difference between (i) a current time and the first time, and (ii) an initial branch counter and the branch counter value.

The method 400 can further include, in response to determining the estimated value is less than the actual guest clock value by a threshold value, updating the average time between execution of branch instructions so that the estimated value is less than, or equal to, the actual guest clock value and greater than, or equal to, the actual guest clock value minus the threshold value. The method 400 can further include, wherein updating the average time between execution of branch instructions includes determining a difference between (i) a current time and the first time, and (ii) an initial branch counter value and the branch counter value.

The method 400 can further include, in response to determining the estimated value is less than the actual guest clock value by a threshold value, setting the estimated value to the actual guest clock value. The method 400 can further include using the estimated value as a basis for a value of another clock.

Figure 5:
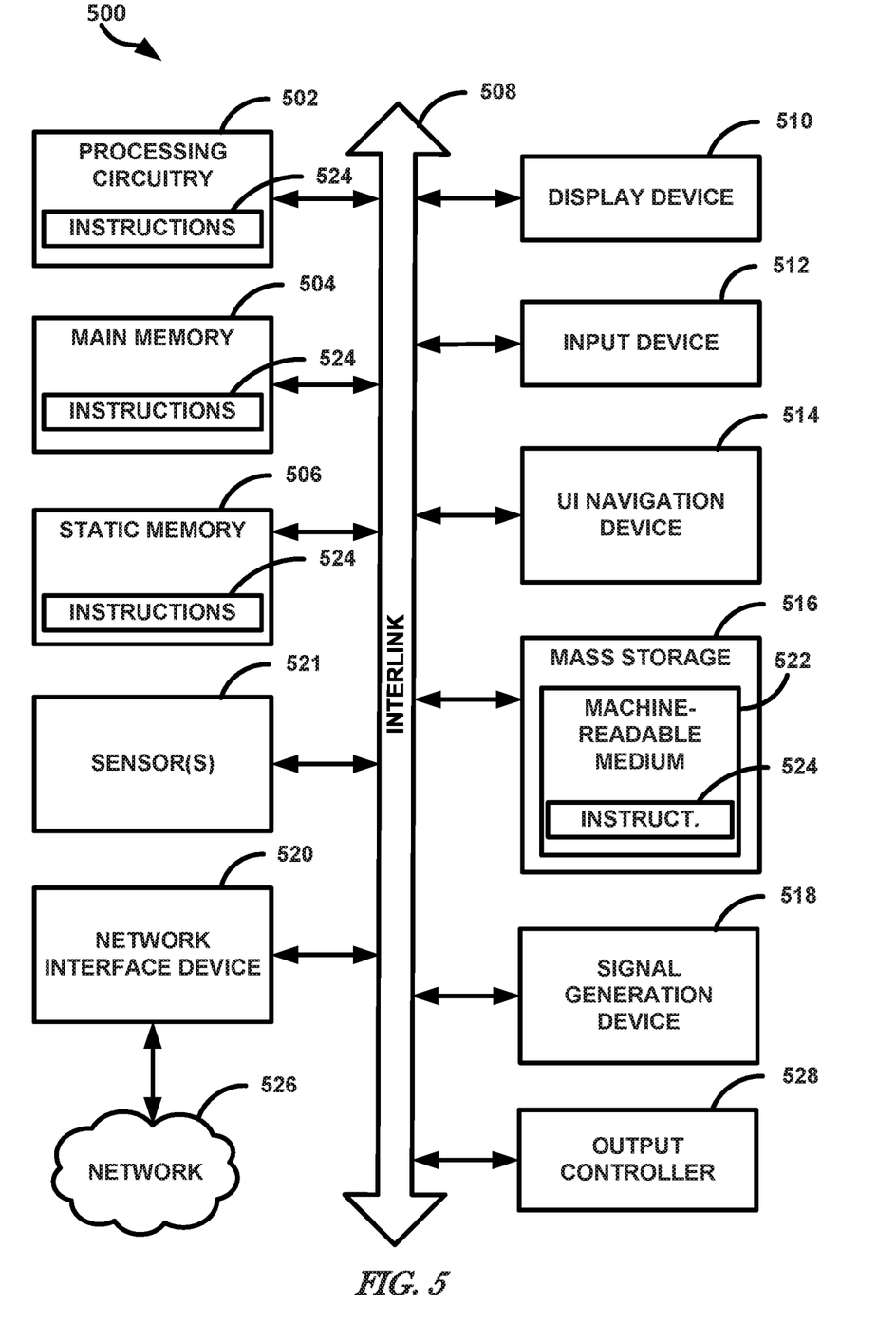
FIG. 5 illustrates, by way of example, a block diagram of an embodiment of a machine on which one or more of the methods, such as those discussed about FIG. 2 and FIG. 4 and elsewhere herein can be implemented.

FIG. 5 illustrates, by way of example, a block diagram of an embodiment of a machine 500 on which one or more of the methods, such as those discussed about FIG. 2 and FIG. 4 and elsewhere herein can be implemented. In one or more embodiments, one or more items of the guest VM 101 or components thereof, such as the guest clock 102, the virtual processor 104A-104B, the branch counter 106A-106B, the guest clock estimator 108A-108B, the comparator 110A-110B, the estimator adjust 112A-112B, and the multiplexer 114A-114B, can be implemented by the machine 500.

In alternative embodiments, the machine 500 operates as a standalone device or may be connected (e.g., networked) to other machines. In a networked deployment, the machine 500 may operate in the capacity of a server or a client machine in server-client network environment, or as a peer machine in a peer-to-peer (or distributed) network environment. The machine 500 may be a personal computer (PC), a tablet PC, a set-top box (STB), a Personal Digital Assistant (PDA), a cellular telephone, a web appliance, a network router, switch or bridge, embedded computer or hardware, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 500 includes processing circuitry 502 (e.g., a hardware processor, such as can include a central processing unit (CPU), a graphics processing unit (GPU), an application specific integrated circuit, circuitry, such as one or more transistors, resistors, capacitors, inductors, diodes, logic gates, multiplexers, oscillators, buffers, modulators, regulators, amplifiers, demodulators, or radios (e.g., transmit circuitry or receive circuitry or transceiver circuitry, such as radio frequency (RF) or other electromagnetic, optical, audio, non-audible acoustic, or the like), sensors 521 (e.g., a transducer that converts one form of energy (e.g., light, heat, electrical, mechanical, or other energy) to another form of energy), or the like, or a combination thereof), a main memory 504 and a static memory 506, which communicate with each other and all other elements of machine 500 via a bus 508. The transmit circuitry or receive circuitry can include one or more antennas, oscillators, modulators, regulators, amplifiers, demodulators, optical receivers or transmitters, acoustic receivers (e.g., microphones) or transmitters (e.g., speakers) or the like. The RF transmit circuitry can be configured to produce energy at a specified primary frequency to include a specified harmonic frequency.

The machine 500 (e.g., computer system) may further include a video display unit 510 (e.g., a liquid crystal display (LCD) or a cathode ray tube (CRT)). The machine 500 also includes an alphanumeric input device 512 (e.g., a keyboard), a user interface (UI) navigation device 514 (e.g., a mouse), a disk drive or mass storage unit 516, a signal generation device 518 (e.g., a speaker) and a network interface device 520.

The mass storage unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processing circuitry 502 during execution thereof by the machine 500, the main memory 504 and the processing circuitry 502 also constituting machine-readable media. One or more of the main memory 504, the mass storage unit 516, or other memory device can store the job data, transmitter characteristics, or other data for executing the method of FIG. 2 or 4.

The machine 500 as illustrated includes an output controller 528. The output controller 528 manages data flow to/from the machine 500. The output controller 528 is sometimes called a device controller, with software that directly interacts with the output controller 528 being called a device driver.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that can store, encode or carry instructions for execution by the machine and that cause the machine to perform any one or more of the methodologies of the present invention, or that can store, encode or carry data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 524 may further be transmitted or received over a communications network 526 using a transmission medium. The instructions 524 may be transmitted using the network interface device 520 and any one of several well-known transfer protocols (e.g., hypertext transfer protocol (HTTP), user datagram protocol (UDP), transmission control protocol (TCP)/internet protocol (IP)). The network 526 can include a point-to-point link using a serial protocol, or other well-known transfer protocol. Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that can store, encode or carry instructions for execution by the machine, and includes digital or analog communications signals or other intangible media to facilitate communication of such software.

EXAMPLES AND ADDITIONAL NOTES

Example 1 can include a system comprising a memory, a guest virtual machine including a guest clock and a virtual processor, the virtual processor operable to perform operations comprising estimating a value of the guest clock based on a current branch counter value that indicates a number of branch instructions executed since a first time and an average time between execution of branch instructions, comparing the estimated value to an actual guest clock value of the guest clock, and in response to determining the estimated value is less than the actual guest clock value, recording the number of branch instructions, the first time, and the average time between execution of branch instructions in the memory.

In Example 2, Example 1 can further include, wherein the operations further comprise, in response to determining the estimated value is greater than the actual guest clock value, updating the average time between execution of branch instructions so that the estimated value is less than, or equal to, the actual guest clock value.

In Example 3, Example 2 can further include, wherein updating the average time between execution of branch instructions includes determining a difference between (i) a current time and the first time, and (ii) an initial branch counter and the branch counter value.

In Example 4, at least one of Examples 2-3 can further include, wherein the operations further comprise, in response to determining the estimated value is less than the actual guest clock value by a threshold value, updating the average time between execution of branch instructions so that the estimated value is less than, or equal to, the actual guest clock value and greater than the actual guest clock value minus the threshold value.

In Example 5, Example 4 can further include, wherein updating the average time between execution of branch instructions includes determining a difference between (i) a current time and the first time, and (ii) an initial branch counter value and the branch counter value.

In Example 6, Example 5 can further include, wherein the operations further comprise, in response to determining the estimated value is less than the actual guest clock value by a threshold value, setting the estimated value to the actual guest clock value.

In Example 7, at least one of Examples 1-6 can further include another clock, and wherein the estimated value is used as a basis for a value of the another clock.

Example 8 includes a method comprising estimating, using a virtual processor of a guest virtual machine, a value of the guest clock of the guest virtual machine based on (a) a current branch counter value that indicates a number of branch instructions executed since a first time and (b) an average time between execution of branch instructions, comparing the estimated value to an actual guest clock value of a guest clock of the guest virtual machine, and in response to determining the estimated value is less than the actual guest clock value, recording the number of branch instructions, the first time, and the average time between execution of branch instructions in a memory.

In Example 9, Example 8 can further include, in response to determining the estimated value is greater than the actual guest clock value, updating the average time between execution of branch instructions so that the estimated value is less than, or equal to, the actual guest clock value.

In Example 10, Example 9 can further include, wherein updating the average time between execution of branch instructions includes determining a difference between (i) a current time and the first time, and (ii) an initial branch counter and the branch counter value.

In Example 11, at least one of Examples 9-10 can further include, in response to determining the estimated value is less than the actual guest clock value by a threshold value, updating the average time between execution of branch instructions so that the estimated value is less than, or equal to, the actual guest clock value and greater than, or equal to, the actual guest clock value minus the threshold value.

In Example 12, Example 11 can further include, wherein updating the average time between execution of branch instructions includes determining a difference between (i) a current time and the first time, and (ii) an initial branch counter value and the branch counter value.

In Example 13, Example 12 can further include, in response to determining the estimated value is less than the actual guest clock value by a threshold value, setting the estimated value to the actual guest clock value.

In Example 14, at least one of Examples 8-13 can further include using the estimated value as a basis for a value of another clock.

Example 15 includes a non-transitory machine-readable medium including instructions that, when executed by a virtual processor of a guest virtual machine, cause the guest virtual machine to perform operations comprising estimating a value of a guest clock of the guest virtual machine based on (a) a current branch counter value that indicates a number of branch instructions executed since a first time and (b) an average time between execution of branch instructions, comparing the estimated value to an actual guest clock value of a guest clock of the guest virtual machine, and in response to determining the estimated value is less than the actual guest clock value minus the threshold, recording the number of branch instructions, the first time, and the average time between execution of branch instructions in a memory.

In Example 16, Example 15 can further include, wherein the operations further comprise, in response to determining the estimated value is greater than the actual guest clock value, updating the average time between execution of branch instructions so that the estimated value is less than, or equal to, the actual guest clock value.

In Example 17, Example 16 can further include, wherein updating the average time between execution of branch instructions includes determining a difference between (i) a current time and the first time, and (ii) an initial branch counter and the branch counter value.

In Example 18, at least one of Examples 16-17 can further include, wherein the operations further comprise, in response to determining the estimated value is less than the actual guest clock value by a threshold value, updating the average time between execution of branch instructions so that the estimated value is less than, or equal to, the actual guest clock value and greater than, or equal to, the actual guest clock value minus the threshold value.

In Example 19, Example 18 can further include, wherein updating the average time between execution of branch instructions includes determining a difference between (i) a current time and the first time, and (ii) an initial branch counter value and the branch counter value.

In Example 20, Example 19 can further include, wherein the operations further comprise, in response to determining the estimated value is less than the actual guest clock value by a threshold value, setting the estimated value to the actual guest clock value.

In Example 21, at least one of Examples 16-20 can further include, wherein the operations further comprise using the estimated value as a basis for a value of another clock.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:
1. A system comprising:
a memory;

a guest virtual machine including a guest clock and a virtual processor, the virtual processor operable to perform operations comprising:

executing a plurality of instructions in sequence;

determining whether each instruction being executed in sequence by the virtual processor of the guest virtual machine accesses the guest clock;

only in response to determining the instruction accesses the guest clock, estimating a value of the guest clock based on a calculated current branch counter value that indicates a number of branch in executed since a calculated first time and a calculated average time between execution of branch instructions;

comparing the estimated value to an actual guest clock value of the guest clock determined by the access of the guest clock;

re-calculating the number of branch instructions, the first time, and the average time between execution of branch instructions in response to the estimated value being less than the actual guest clock value by a threshold value or the estimated value is greater than the actual guest clock value;

recording the recalculated number of number of branch instructions, the first time, and the average time between execution of branch instruct in the memory; and providing an estimate of the value of the quest clock based on the recorded re-calculated number of branch instructions, the first time, and the average time between execution of branch instructions for replay of the execution of the plurality of instructions.

2. The system of claim 1, wherein the operations further comprise, in response to determining the estimated value is greater than the actual guest clock value, re-calculating the average time between execution of branch instructions so that the estimated value is less than, or equal to, the actual guest clock value.

3. The system of claim 2, wherein re-calculating the average time between execution of branch instructions includes determining a difference between (i) a current time and the first time, and (ii) an initial branch counter and the branch counter value.

4. The system of claim 2, wherein the operations further comprise, in response to determining the estimated value is less than the actual guest clock value by a threshold value, updating the average time between execution of branch instructions so that the estimated value is in a range of values defined by an upper limit of the actual guest clock value and a lower limit of the actual guest clock value minus the threshold value.

5. The system of claim 4, wherein re-calculating the average time between execution of branch instructions includes determining a difference between (i) a current time and the first time, and (ii) an initial branch counter value and the branch counter value.

6. The system of claim 5, wherein the operations further comprising, in response to determining the estimated value is less than the actual guest clock value by a threshold value, setting the estimated value to the actual guest clock value.

7. The system of claim 1, further comprising another clock, and wherein the estimated value is used as a basis for a value of the another clock.

8. A method comprising:

executing, by a virtual processor of a guest virtual machne, a plurality of instructions in sequence;

only in response to executing a guest clock access instruction by the virtual processor, estimating, using the virtual processor, a value of a guest clock based on (a) a calculated current branch counter value that indicates a number of branch instructions executed since a calculated first time and (b) a calculated average time between execution of branch instructions;

comparing, using the virtual processor, the estimated value to an actual guest clock value of the guest clock of the guest virtual machine determined by the guest clock access instruction;

in response to determining, using the virtual processor, that the estimated value is less than the actual guest clock value by a threshold value, or that the estimated value is greater than the actual guest clock value, re-calculating and recording the re-calculated number of branch instructions, the re-calculated first time, and the re-calculated average time between execution of branch instructions in a memory; and providing, using the virtual processor, an estimate of the value of the guest clock based on the recorded re-calculated number of branch instructions, the first time, and the average time between execution of branch instructions for replay of the execution of the plurality of instructions.

9. The method of claim 8 further comprising, in response to determining the estimated value is greater than the actual guest clock value, re-calculating the average time between execution of branch instructions so that the estimated value is less than, or equal to, the actual guest clock value.

10. The method of claim 9, wherein re-calculating the average time between execution of branch instructions includes determining a difference between (i) a current time and the first time, and (ii) an initial branch counter and the branch counter value.

11. The method of claim 9, further comprising, in response to determining the estimated value is less than the actual guest clock value by a threshold value, re-calculating the average time between execution of branch instructions so that the estimated value is in a range of values defined by an upper limit of the actual guest clock value and a lower limit of the actual guest clock value minus the threshold value.

12. The method of claim 11, wherein re-calculating the average time between execution of branch instructions includes determining a difference between (i) a current time and the first time, and (ii) an initial branch counter value and the branch counter value.

13. The method of claim 12, further comprising, in response to determining the estimated value is less than the actual guest clock value by a threshold value, setting the estimated value to the actual guest clock value.

14. The method of claim 8, further comprising using the estimated value as a basis for a value of another clock.

15. A non-transitory machine-readable medium including instructions that, when executed by a virtual processor of a guest virtual machine, cause the guest virtual machine to perform operations comprising:

executing, by the guest virtual machine, a plurality of instructions in sequence;

determining whether each instruction being executed in sequence by the guest virtual machine accesses a guest clock;

only in response to determining the instruction accesses the guest clock, estimating a value of the guest clock based on (a) a calculated current branch counter value that indicates a number of branch instructions executed since a calculated first time and (b) a calculated average time between execution of branch instructions;

comparing the estimated value to an actual guest clock value of the guest clock of the guest virtual machine determined by the access of the guest clock;

in response to the estimated value being less than the actual guest clock value by a threshold value, or the estimated value being greater than the actual guest clock value, re-calculating and recording the re-calculated number of branch instructions, the re-calculated first time, and the re-calculated average time between execution of branch instructions in a memory; and providing an estimate of the value of the guest clock based on the recorded re-calculated number of branch instructions, the first time, and the average time between execution of branch instructions for replay of the execution of the plurality of instructions.

16. The non-transitory machine-readable medium of claim 15, wherein the operations further comprise, in response to determining the estimated value is greater than the actual guest clock value, re-calculating the average time between execution of branch instructions so that the estimated value is less than, or equal to, the actual guest clock value.

17. The non-transitory machine-readable medium of claim 16, wherein re-calculating the average time between execution of branch instructions includes determining a difference between (i) a current time and the first time, and (ii) an initial branch counter and the branch counter value.

18. The non-transitory machine-readable medium of claim 16, wherein the operations further comprise, in response to determining the estimated value is less than the actual guest clock value by a threshold value, re-calculating the average time between execution of branch instructions so that the estimated value is in a range of values defined by an upper limit of the actual guest clock value and a lower limit of the actual guest clock value minus the threshold value.

19. The non-transitory machine-readable medium of claim 18, wherein re-calculating the average time between execution of branch instructions includes determining a difference between (i) a current time and the first time, and (ii) an initial branch counter value and the branch counter value.

20. The non-transitory machine-readable medium of claim 19, wherein the operations further comprise, in response to determining the estimated value is less than the actual guest clock value by a threshold value, setting the estimated value to the actual guest clock value.

* * * * *

UNITED STATES PATENT AND TRADEMARK OFFICE
CERTIFICATE OF CORRECTION

| | | |
|---|---|---|
| PATENT NO. | : 10,908,935 B1 | Page 1 of 1 |
| APPLICATION NO. | : 16/053468 | |
| DATED | : February 2, 2021 | |
| INVENTOR(S) | : Taylor et al. | |

It is certified that error appears in the above-identified patent and that said Letters Patent is hereby corrected as shown below:

In the Claims

In Column 11, Line 11, in Claim 1, delete "branch in" and insert --branch instructions-- therefor In Column 11, Line 23, in Claim 1, delete "recalculated" and insert --re-calculated-- therefor In Column 11, Line 23, in Claim 1, delete "number of number of" and insert --number of-- therefor In Column 11, Line 65, in Claim 8, delete "machne," and insert --machine,-- therefor Signed and Sealed this
First Day of March, 2022

Drew Hirshfeld
*Performing the Functions and Duties of the
Under Secretary of Commerce for Intellectual Property and
Director of the United States Patent and Trademark Office*